Figure 1:
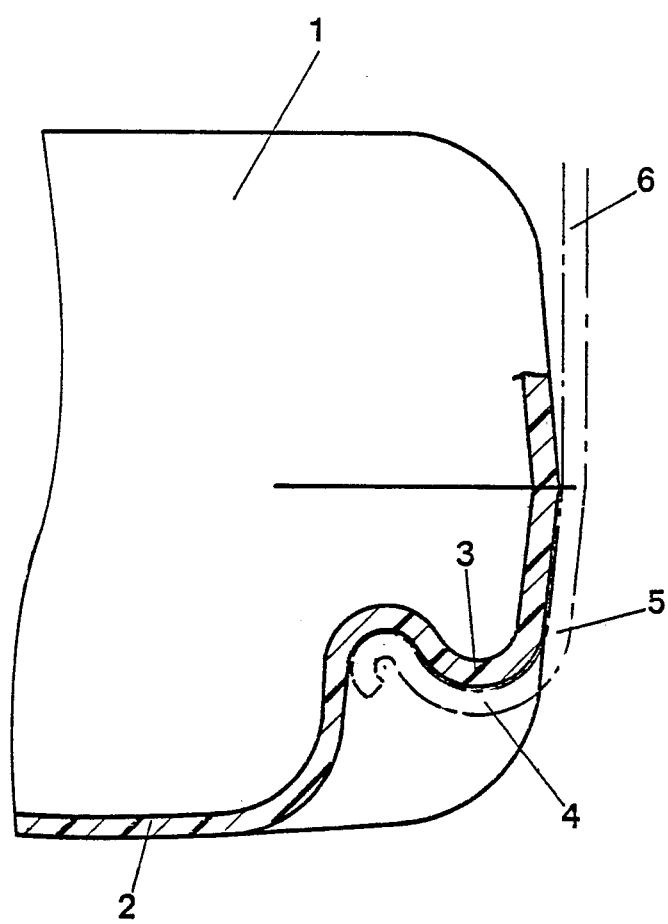

United States Patent [19]

Héaumé

[11] Patent Number: 4,553,681
[45] Date of Patent: Nov. 19, 1985

[54] FUEL TANK FOR A MOTOR VEHICLE

[75] Inventor: Jean Héaumé, Laval, France

[73] Assignee: Societe de Transformation des Matieres Plastiques, Laval, France

[21] Appl. No.: 231,324

[22] Filed: Feb. 4, 1981

[30] Foreign Application Priority Data

Feb. 4, 1980 [FR] France .................................. 80 02411

[51] Int. Cl.⁴ ........................ B65D 1/42; B65D 90/12; B65D 88/02
[52] U.S. Cl. ..................................... 220/72; 280/5 A
[58] Field of Search ............... 220/1 V, 1 T, 72, 86 R; 280/5 A

[56] References Cited

U.S. PATENT DOCUMENTS

| 2,846,231 | 4/1958 | Fritz | 280/5 A |
| 3,306,486 | 2/1967 | Martino | 220/1 T |
| 3,552,599 | 1/1971 | Redding | 220/72 |
| 3,701,540 | 10/1972 | Pringle | 280/5 A |

FOREIGN PATENT DOCUMENTS

| 1211860 | 3/1966 | Fed. Rep. of Germany | 280/5 A |
| 822400 | 10/1959 | United Kingdom | 220/1 V |

Primary Examiner—George F. Lowrance
Attorney, Agent, or Firm—Spencer & Frank

[57] ABSTRACT

Fuel tank for a motor vehicle, the lower wall of which possesses, on its periphery, bosses 3 which permit the engagement of the curved head 4 of the suspension hooks 5 used for fixing the said tank, and, if appropriate, possesses vertical grooves 9 in its side wall 8, which trap the straight part 6 of the suspension hooks 5.

7 Claims, 4 Drawing Figures

FUEL TANK FOR A MOTOR VEHICLE

The present invention relates to a fuel tank for a motor vehicle, which is designed so that it can be fixed to the vehicle in a very effective and durable manner by suspension.

Fuel tanks, and in particular those made from thermoplastics, are generally suspended and fixed to the vehicles by means of metal straps which surround the tanks and which are firmly attached to fixed members on the vehicles. Fixing fuel tanks by means of straps is a difficult operation because, on the one hand, the straps should be sufficiently tight to ensure effective fixing, and, on the other hand, they should not be too tight, in order to avoid causing shearing of the wall of the tank in the course of time.

Furthermore, fixing by means of metal straps exhibits another serious disadvantage in the case of tanks made of thermoplastics. In fact, in order to be acceptable, this type of tank must successfully resist fire. The tests carried out to evaluate this resistance generally imply that the tank resists the action of a direct flame for a relatively long time. In this case, it has been found that the presence of metal straps which are good heat conductors has the effect of considerably accelerating the melting of the wall of the tank at the point where the said wall is in contact with these straps. To overcome this shortcoming, metal straps coated with a heat insulator have been used. This increases the fixing cost and sometimes makes fixing more difficult.

The object of the present invention is to provide tanks, the particular design of which no longer exhibits the disadvantages described above because they can be fixed to the vehicle very effectively by means of suspension hooks rather than by means of straps.

These hooks can be of circular, oval or rectangular cross-section in order to ensure gripping of the tank over a more or less large width.

To this effect, the present invention relates to a fuel tank for a motor vehicle, which is intended to be suspended under the vehicle, and which possesses bosses in relief on the periphery of its lower wall, permitting the engagement of the curved head of the suspension hooks.

Preferably, the bosses possess a profile which is such that they fit exactly into the curved head of the suspension hooks which are used for fixing the tank and which are snapped into position.

According to a preferred embodiment, the bosses are located in a hollow in the side walls, making it possible laterally to lock the curved head of the fixing hook, engaged in the boss.

The number of bosses is arbitrary and obviously corresponds to the number of suspension hooks used for fixing the tank. These bosses can be distributed over the whole periphery of the lower wall of the tank or only in certain zones of this periphery.

In a preferred embodiment, the side wall of the tank possesses vertical grooves located at right-angles to the bosses, which can house the straight part of the suspension hooks, preferably by an effect of snapping these parts in.

According to another advantageous embodiment, the tank possesses, on its upper wall, projections or hollows which can ensure vertical and/or lateral locking of the tank by cooperation with fixed elements on the motor vehicle.

The tank can be made of metal by the conventional techniques, such as stamping. However, the tank is preferably made of thermoplastic and, in particular, is made from polyolefines, such as high-density polyethylene, which are optionally crosslinked, or from resins containing units derived from acrylonitrile. In this case, the tank according to the invention can be produced directly in a single operation by moulding, and in particular by the known blow-moulding technique.

The tank according to the invention is very easy to fix because it suffices either to insert it by force between the fixing hooks, already in position, and to ensure that the latter fit into the bosses and, if appropriate, into the vertical grooves, or to hold the tank in place and then to position the suspension hooks.

Preferably, the suspension hooks used can be made of metal or plastic. If they are made of metal, they can advantageously be covered with a plastic or another thermally insulating coating in order to ensure that the fuel tank has good fire characteristics. These hooks can be of circular, oval or rectangular cross-section in order to ensure gripping of the tank over a more or less large width.

The fuel tank according to the invention can also possess reliefs or grooves other than those described above, the purpose of which can be to make its shape more rigid.

The tank according to the invention is further illustrated by the figures of the attached drawings, which show two particular possible embodiments and which are given purely by way of explanation and without implying a limitation.

Figure 2:
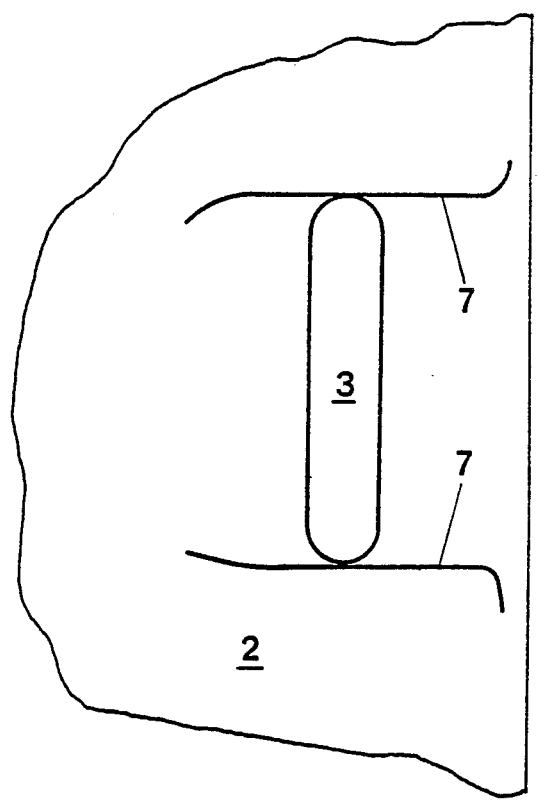
Figure 3:
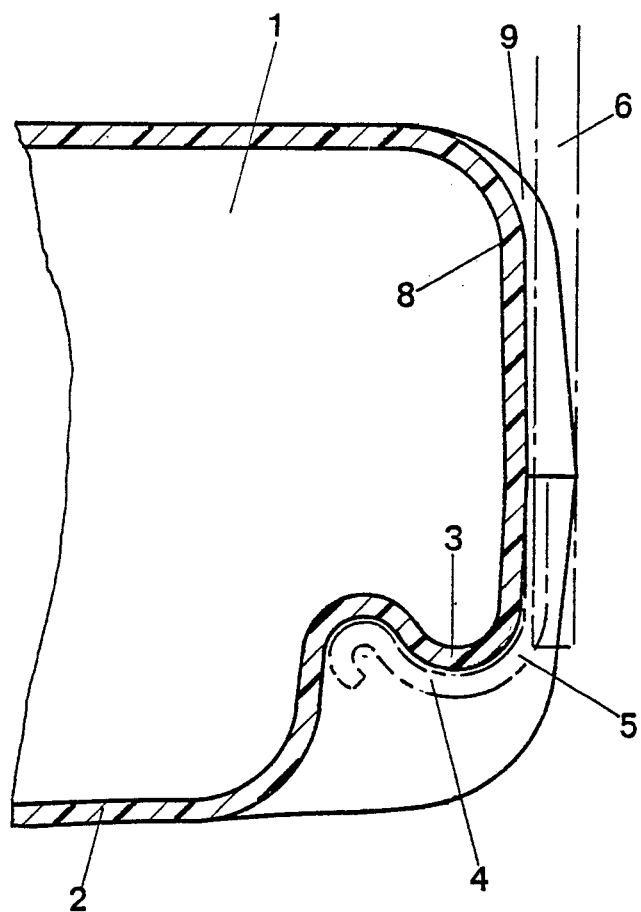
Figure 4:
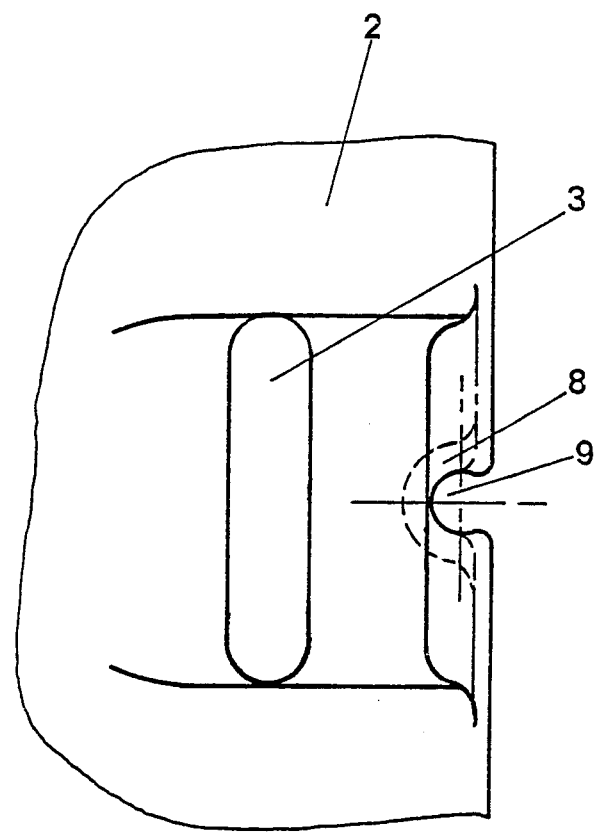

In the drawings,

FIGS. 1 and 2 are partial views, in elevation and in plan, relating to a first embodiment, whilst FIGS. 3 and 4 are similar views relating to a second embodiment, FIGS. 1 and 3 being in section.

As shown in FIGS. 1 and 2, the fuel tank 1, shown in part, possesses, on the periphery of its lower wall 2, bosses 3 which permit the engagement of the curved head 4 of suspension hooks 5, the straight part 6 of which is fixed to the motor vehicle.

The boss 3 is located inside a hollow, the side walls 7 of which lock the curved part 4 of the hooks 5 and prevent the hooks from sliding laterally.

In the figures, only one boss has been shown, and in FIG. 2, the suspension hook is not shown.

FIGS. 3 and 4 illustrate a second embodiment which is similar to that of FIGS. 1 and 2 and also uses bosses 3 provided on the periphery of the lower wall 2 of the fuel tank 1 which is shown in part. In this embodiment, the side wall 8 of the fuel tank 1 possesses vertical grooves 9 which are located at right-angles to the bosses 3 and which can trap the straight part 6 of the suspension hooks 5. In FIG. 4, the suspension hook is not shown.

I claim:

1. Fuel tank for a motor vehicle, which is intended to be suspended under the vehicle by means of suspension hooks, each suspension hook having a straight part and a curved head, characterised in that its lower wall possesses, on its periphery, downwardly protruding bosses which permit the engagement of the curved head of the suspension hooks, its side wall possesses vertical grooves located at right-angles to the bosses, which can house the straight part of the suspension hooks, and the vertical grooves are profiled so as to permit the snapping-in of the straight part of the hooks.

2. Tank according to claim 1, characterised in that the bosses are located in hollows, the side walls of which make it possible to lock the curved head of the suspension hooks.

3. Tank according to claim 1, characterised in that its upper wall possesses projections or hollows which can ensure locking of the tank in cooperation with fixed elements on the vehicle.

4. Tank according to claim 1, characterised in that it is made from a thermoplastic.

5. Tank according to claim 4, characterised in that it is made from a polyolefine.

6. Tank according to claim 4 or 5, characterised in that it is produced by blow-moulding.

7. In combination, the fuel tank defined in claim 1 and a plurality of suspension hooks each having an upper end fixed to the motor vehicle and a lower end presenting a curved head engaging a respective boss.

* * * * *